United States Patent Office 2,874,976
Patented Feb. 24, 1959

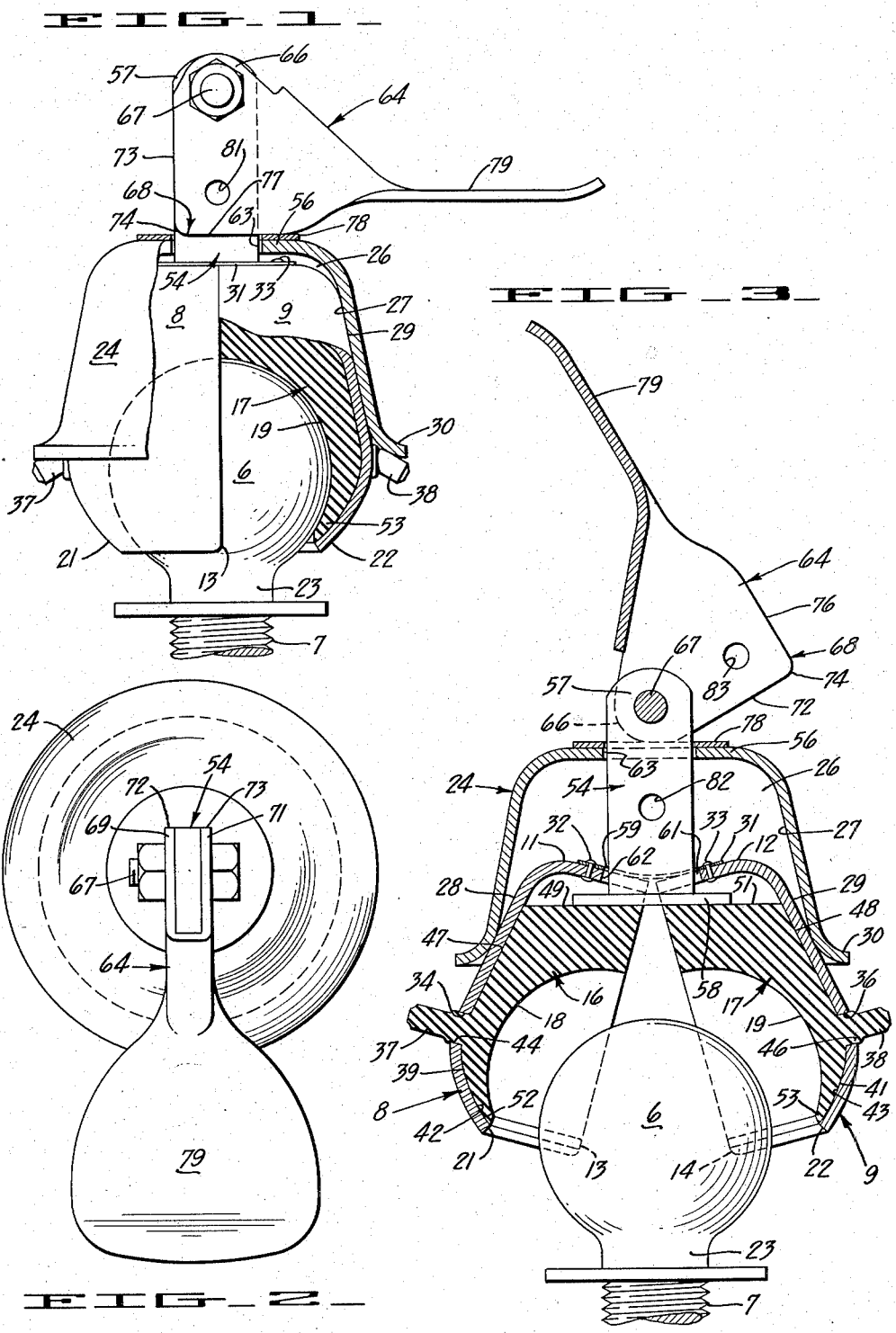

2,874,976

BALL AND SOCKET COUPLING WITH RESILIENT LINER

Frank F. Linn, Oakland, Calif.

Application March 29, 1954, Serial No. 419,172

6 Claims. (Cl. 280—512)

The invention relates to detachable couplings and more particularly to swivel connectors such as used for coupling trailers to automotive vehicles.

An object of the present invention is to provide a coupling of the character described which affords the combination of a greatly improved interlocking action and a rugged, sturdy construction which will positively retain the detachable sections in coupled relation under all conditions of use and including all abnormally severe stresses to which the coupling may be subjected, thereby providing in a coupling of the present character a greater factor of safety than heretofore obtainable.

Another object of the invention is to provide a coupling of the character described which may, with ease and facility, be attached and detached and wherein, upon the simple throwing of a manually engageable lever, the coupling may be automatically opened to receive or release the coupled member and may be closed to locked position.

A further object of the invention is to provide a coupling of the character above which incorporates rubber pad members here specially designed to effect a quiet, powerful holding of the connected sections, effectively prevent the transmission of noise to the automotive vehicle, and greatly reduce the magnitude of the instantaneous shock forces to which the coupling is subjected.

Still another object of the present invention is to provide a coupling of the character described wherein the aforesaid rubber pad members are designed for quick and easy demountable attachment and interchangeability for renewal, and, by use of different sizes, the easy accommodation of different sizes of the coupled members.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to said drawing:

Figure 1 is a side elevation of a coupling constructed in accordance with the present invention illustrated in its closed position, with portions being broken away and shown in section for clarity of illustration.

Figure 2 is a plan view of the coupling illustrated in Figure 1.

Figure 3 is a longitudinal section view of the coupling showing the parts in open position.

The coupling of the present invention and as illustrated in the accompanying drawing is designed for use and attachment to the conventional spherical ball 6 forming part of the trailer hitch attached to the automotive vehicle, the ball 6 here being illustrated with a threaded stud 27 for facilitating its connection in the hitch, although it will be understood that the ball may be otherwise attached as by welding or the like, and that the trailer hitch itself does not form part of the present invention.

The coupling consists briefly of a plurality of sections 8 and 9 connected adjacent one end 11 and 12 for swinging movement of their opposite ends 13 and 14 from a spaced apart open position as illustrated in Figure 3 to a closed position as indicated in Figure 1, so as to respectively receive and embrace the ball 6. As a particularly important feature of the present invention the sections 8 and 9 are provided with rubber pad members 16 and 17 which are formed with inside surfaces 18 and 19 of segmental spherical form cooperating in the closed position of the sections to embrace the majority of the periphery of the ball 6, it being noted from Figure 1 of the drawing that the lower open ends 21 and 22 of the sections extend to adjacent the joinder 23 of the base of the ball with the stud 7 so as to permit limited universal swiveling action between the sections and the ball.

Support for the sections in their closed position is hereby provided by a bell-shaped housing or casing 24 having an interior chamber 26 adapted to receive the connected ends 11 and 12 of the sections and having an interior wall 27 preferably of conical form positioned for engaging and displacing the sections 8 and 9 to closed position upon movement of the sections into the chamber. Preferably, and as here shown, the sections 8 and 9 are of clamshell form, concavo-convex in longitudinal cross-section, as viewed in Figure 3, with the ends 11 and 12 defining the relatively narrower ends, and the ends 13 and 14 defining the wider hemispherical ends of the clamshell shape. In this construction the upper body portions of the sections provide, in closed position, outside surfaces 28 and 29 of frusto-conical form convergently tapered toward the inserted ends 11 and 12. Preferably, and cooperating with this shape, the interior wall 27 of the bell housing is of tapered conical form so as to receive in mating engagement the outside surfaces 28 and 29 of the sections.

The parts are desirably dimensioned so that the lower out-turned rim end 30 of the bell housing is positioned around the sections in the plane of the insert members 16 and 17 in the closed position of the sections so as to provide a reinforcing flange completely around the sections at the plane of the normally greatest application of forces.

Preferably, means is provided for automatically opening the sections to receive or release the ball as illustrated in Figure 3 upon movement of the sections out of the bell housing as illustrated. In the present construction this means is in the form of a normally concavo-convex spring member 31 of disk form which is secured on its normally convex side as by rivets 32 and 33 to the upper ends 11 and 12 of the sections. In this manner the disk is flattened out and biased when in closed position, as illustrated in Figure 1, so as to constantly urge the sections to their spaced apart open position. In the present construction the spring member 31 provides the pivotal connection of the sections to effect their swinging opening and closing motions as above described.

Means for providing quick and easy insertion and removal of the rubber insert members 16 and 17 here includes the provision of openings 34 and 36 through the walls of the lower hemispherical portions of the sections 8 and 9 exteriorly of the open end 30 of the bell housing and which are arranged to receive pins 37 and 38 formed integrally with the rubber insert members and projecting from the outer surfaces thereof in position for entry and securing in the openings 34 and 36. Preferably the pins have a length sufficient to project well through the section walls so that they may be engaged at the outer sides of the sections for pulling of the sections so as to seat the convex outer sides 39 and 41 of the insert members against the concave inner sides 42 and 43 of the sections. Also and as a feature of the present construction the pins 37 and 38 are formed with base portions 44 and 46 which have a normal thickness greater than the width of the openings but which are reduced by the pulling and stretching of the pins in effecting insertion as aforesaid so as to readily enter the openings whereby the base portions will be compressively and firmly held in the openings upon release of the pins.

As will be seen in the drawing, the exterior shape of the rubber insert members conforms precisely with the interior shape of the clamshell sections so that the forces incident on the insert members will be uniformly applied and distributed to the sections. In keeping with this arrangement, the upper side portions 47 and 48 of the rubber insert members are of tapered frusto-conical form, mating with the inside surfaces of the portions 28 and 29 of the sections. The top sides 49 and 51 of the insert members are preferably upwardly tapered in the closed position so as to facilitate the articulation of the sections to open position without interference from the insert members. It will also be noted that the insert members are of greatest depth of section at their upper ends and thin out at their lower ends 52 and 53 at the open ends 21 and 22 of the sections, so as to permit swivel action on the ball, it being noted in this connection that the lower ends 21 and 22 of the sections are disposed well below the diameter of the ball in the closed position so as to absolutely retain the parts in coupled relation under all conditions of use.

The means for moving the sections into and out of the chamber to effect their closing and opening, as aforementioned, here consists of an actuator member 54 secured to the connected ends 11 and 12 of the sections and extending therefrom through the upper end wall 56 of the bell housing, and having an outer end 57 disposed exteriorly thereof for engagement and movement. Connection of the member 54 to the sections is effected by an enlarged head 58 at the lower end of the member and supported between the upper ends 49 and 51 of the insert members and the inside surfaces of the section ends 11 and 12, and which engages such surfaces of the sections for drawing the sections into the chamber of the bell housing upon outward displacement of the member 54. As an important feature of the present invention, means is provided for preventing relative rotative displacement between the sections 8 and 9 and the bell housing 24 so that rotative moments between the coupling and the ball will require a rotative displacement between the sections and the ball, rather than between the sections and the bell housing. Conveniently, this means is incorporated in the actuating means 54 by making the interengaged portions of this means and the sections and the bell housing of non-circular cross-section whereby these several parts are keyed to permit axial reciprocation while preventing relative rotative displacement. As here shown, the member 54 is of flat, generally rectangular form and engages through opposed rectangular slots 59 and 61 in the upper ends 11 and 12 of the sections and through a registering rectangular opening 62 in the spring member 31, and the actuating member 54 extends out through a similar rectangular opening 63 in the end 56 of the bell housing.

Displacement of the actuating member 54 to cause the movement of the sections 8 and 9 between their open and closed positions is effected by a manually engageable lever 64 pivotally connected adjacent one end 66, as by means of a pin 67, to the upper end 57 of the actuating member 54, the lever being provided intermediate its length with a cam portion 68 engageable with the end wall 56 of the bell housing to effect displacement of the member 54 and connected sections upon rotative displacement of the lever between terminal positions, as illustrated in Figures 1 and 3.

As a further feature of the present construction the cam portion 68 is designed to move into an over center locked position upon movement of the lever 64 to the terminal position corresponding to the closed position of the sections, as shown in Figure 1. As will be seen from the drawings, the lever is here formed with a pair of spaced parallel sides 69 and 71 mounted on opposite sides of the actuating member 54 and secured thereto by the pivot pin 67 passing through registering openings in the lever sides 69 and 71 and the upper end 57 of the actuating member. In the closed position of the lever, as shown in Figures 1 and 2, the lever sides are provided with forwardly disposed edges 72 and 73 which extend parallel to the member 54 down to the end wall 56, where the sides turn in a rounded corner portion 74, providing the camming action above noted, and continue in perpendicularly arranged base sides 76 and 77 which are arranged to seat upon the end wall 56. Preferably, a washer 78 of hardened, wear-resistant material is mounted around the member 54 at the end 56 for engagement with the edges and corner portion of the sides during movement of the lever between open and closed positions. From the base sides 76 and 77 the lever extends back in a flattened, generally fan-shaped handle portion 79. In the over center locked position of the lever as illustrated in Figure 1, the lever sides 69 and 71 and the intermediate member 54 are provided with aligned openings 81, 82 and 83 for receipt of a locking pin such as a cotter key or the like (not shown).

The insert members 16 and 17 may be formed of any suitable soft compressible material. Rubber, considered in its broadest sense of including both natural and synthetic materials, is suggested. Certain synthetic materials such as neoprene are preferred for their grease-resistant qualities and these materials may be compounded with a lubricant or filler such as wax or the like to control the amount of friction desired in the engagement of the members with the ball. Also, slippage may be provided by making the inside surfaces 18 and 19 of the members with grooves or dimples or the like. Rubber compound cured to a durometer of about 74 has been found to give good results. The inserts thus fashioned provide a greaseless, noiseless connection between the automobile and the trailer and serves as insulators or sound deadeners, preventing the transmission of noise from the trailer to the car. Also the members serve as a cushion which substantially reduces the magnitude of the high, instantaneous shock forces which occur in pulling a trailer. This cushioning of the forces and the adoption of metal shapes of the strongest forms provide a coupling of extraordinary strength and safety. The insert members and other parts should be dimensioned so that for ordinary trailer coupling use the inserts engage the ball with only sufficient pressure to provide a one hundred percent bearing with commercially obtainable balls, which are of quite poor precision and somewhat imperfect in their spherical form. Inserts may be easily provided for all popular size balls, ranging from about 1½ to 2½ inches in diameter, and the appropriate insert may be easily installed, as above described, to couple with the particular ball provided on the automobile.

As will be understood, the coupling is designed for attaching to the tongue of a trailer or the like by fastening the bell housing 24 to the tongue. For this purpose the latter may be provided with an opening to receive the outside periphery of the bell housing and the latter welded in place on the tongue. To couple to the ball provided on the trailer hitch of the automobile, the lever 64 is swung to an open position, as illustrated in Figure 3, thereby dropping the sections 8 and 9 into their open position. The trailer tongue may then be lifted to position the open coupling over the ball and lowered onto the ball. As the weight of the tongue is manually released, the ball will push the sections 8 and 9 partially up into the bell housing, thus elevating the actuator member 54 and the lever, and pushing the cam corner 74 in the proximity of the washer 78. Rotation of the lever may then be readily effected to the over center locked position illustrated in Figure 1. A locking pin may then be inserted in the aligned openings 81, 82 and 83 as a further safety precaution.

While the coupler has been described with reference to its use with a trailer hitch, it will be understood that the unit may have other and general use wherever a detachable coupling is desired for towing or transmission of force or power. By regulating the pressure of the rubber insert members against the ball and by controlling the hardness and ingredients used in compounding the rubber, any degree of friction or sliding action between the coupling and the ball may be effected, between a sliding action on the one hand and a firmly gripped connection on the other. Due to the large area of surface contact between the ball and the insert members, the device may thus be used as a clutch or the like for selective transmission of rotary power, as in a driveshaft or the like.

I claim:

1. A connector for coupling trailers to automotive vehicles and the like having a spherical coupling ball comprising, a pair of clam shell sections having a hinged connection adjacent one end of each section for swinging movement of the sections from a spaced-apart open position admitting said ball therebetween to a closed position about said ball, said sections having inside surfaces of segmental spherical form dimensioned to embrace a majority of the periphery of said ball and having outside surfaces of frusto-conical form convergently tapered towards said ends, a bell-shaped housing formed to receive in mating engagement said outside section surfaces in closed position, means functioning to displace said sections in axial directions into and out of said housing to effect closing and to permit opening respectively of said sections, a pair of rubber members mounted upon said inside surfaces of said sections and having opposed inside concave recesses of substantially semi-spherical form engageable on opposite sides of said ball to provide a complete and exclusive rubber embrace of the majority of the periphery of said ball and having a thickness causing the compressive embrace of said ball within said recesses upon displacing of said sections to closed position, and a spring connected to said sections and acting across said hinged connection and tensioned by the closing of said sections for displacing said sections to open position when displaced out of said housing, and means preventing relative rotative displacement between said sections and housing so that the drive between said vehicle and trailer will be exclusively through the resilient compressibility of said rubber embrace.

2. A connector as characterized in claim 1 wherein said means for displacing said sections in axial directions includes an actuating member keyed to said sections and said housing to additionally provide the aforesaid means for preventing rotative displacement between said sections and housing.

3. A connector as characterized in claim 2 wherein said actuating member is secured to the connected ends of said sections and extends through an end wall of said housing and exteriorly thereof, and a manually engageable lever is pivoted adjacent one end of said actuating member and is provided with a cam portion engageable with said end wall to effect displacement of said sections between closed and open positions upon rotary displacement of said lever between terminal positions, said cam portion being designed to cooperate with the resilient compression of said rubber members to move into an over-center locked position upon movement of said lever to said terminal position corresponding to the closed position of said sections.

4. A connector as characterized in claim 1 wherein the open rim of said bell-shaped housing is formed with an out-turned annular flange positioned adjacent to and surrounding the greatest transverse diameter of the outside surfaces of said opposed sections in said inserted closed positions of said sections in said housing so as to provide an external annular reinforcing flange around said housing.

5. A connector as characterized in claim 4 wherein said rubber members are formed as removable inserts of concavo-convex form having convex outer surfaces detachably mounted upon said inside surfaces of said sections and wherein said sections are formed with openings through the walls thereof and said rubber insert members are formed with pins projecting from the outer convex surfaces thereof and positioned for entry and securing in said openings to detachably support said rubber members on said sections and wherein said openings are positioned to locate said pins exteriorly of the open end of said bell-shaped housing in said closed position of said sections.

6. A connector for coupling trailers to automotive vehicles and the like having a spherical coupling ball comprising, a pair of clam shell sections having a hinged connection adjacent one end of each section for swinging movement of the sections from a spaced-apart open position admitting said ball therebetween to a closed position about said ball, said sections having inside surfaces of segmental spherical form dimensioned to embrace a majority of the periphery of said ball and having outside surfaces of frusto-conical form convergently tapered towards said ends, a bell-shaped housing formed to receive in mating engagement said outside section surfaces in closed position, means functioning to displace said sections in axial directions into and out of said housing to effect closing and to permit opening respectively of said sections, a pair of removable rubber insert members of concavo-convex form having convex outer surfaces detachably mounted upon said inside surfaces of said sections and having opposed inside concave recesses of substantially semi-spherical form engageable on opposite sides of said ball to provide a complete and exclusive rubber embrace of the majority of the periphery of said ball and having a thickness causing the compressive embrace of said ball within said recesses upon displacing of said sections to closed position, and a normally concavo-convex member of resilient material fastened to said first mentioned ends of said sections and being flatened to a spring-biased position in the closed position of said sections for displacing said sections to open position when displaced out of said housing.

References Cited in the file of this patent

UNITED STATES PATENTS

| | | |
|---|---|---|
| 757,769 | Reece | Apr. 19, 1904 |
| 815,563 | Stevenson | Mar. 20, 1906 |
| 1,980,117 | Turner et al. | Nov. 6, 1934 |
| 2,170,980 | Thorp et al. | Aug. 29, 1939 |
| 2,368,200 | Cavanagh | Jan. 30, 1945 |
| 2,532,676 | Shaieb | Dec. 5, 1950 |
| 2,590,264 | Meyers et al. | Mar. 25, 1952 |

FOREIGN PATENTS

| | | |
|---|---|---|
| 511,173 | Germany | Oct. 27, 1930 |